(12) United States Patent
Takakura et al.

(10) Patent No.: US 9,994,215 B2
(45) Date of Patent: Jun. 12, 2018

(54) HYBRID VEHICLE

(71) Applicant: Toyota Jidosha Kabushiki Kaisha, Toyota-shi Aichi-ken (JP)

(72) Inventors: Shikoh Takakura, Toyota (JP); Shinichiro Minegishi, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days. days.

(21) Appl. No.: 15/458,374

(22) Filed: Mar. 14, 2017

(65) Prior Publication Data
US 2017/0267231 A1 Sep. 21, 2017

(30) Foreign Application Priority Data
Mar. 16, 2016 (JP) .................. 2016-052816

(51) Int. Cl.
*B60L 3/04* (2006.01)
*B60W 20/50* (2016.01)
*B60W 20/40* (2016.01)
*B60K 6/46* (2007.10)
*B60K 6/26* (2007.10)
*B60W 10/06* (2006.01)
*B60W 10/08* (2006.01)

(52) U.S. Cl.
CPC .............. *B60W 20/40* (2013.01); *B60K 6/26* (2013.01); *B60K 6/46* (2013.01); *B60W 10/06* (2013.01); *B60W 10/08* (2013.01); *B60W 20/50* (2013.01); *B60W 2420/00* (2013.01); *B60W 2710/06* (2013.01); *B60W 2710/08* (2013.01); *B60Y 2200/92* (2013.01); *B60Y 2300/188* (2013.01); *Y02T 10/7258* (2013.01); *Y10S 903/93* (2013.01)

(58) Field of Classification Search
CPC .................................. B60L 3/04; B60W 20/50
See application file for complete search history.

(56) References Cited

U.S. PATENT DOCUMENTS

| | | | | |
|---|---|---|---|---|
| 3,681,675 A | * | 8/1972 | Preiser | H02M 1/06 318/810 |
| 2011/0307136 A1 | * | 12/2011 | Komata | B60K 6/365 701/22 |
| 2013/0286514 A1 | * | 10/2013 | Oguchi | B60L 3/003 361/31 |

FOREIGN PATENT DOCUMENTS

JP 2009-060726 A 3/2009

* cited by examiner

Primary Examiner — Bryan A Evans
(74) Attorney, Agent, or Firm — Dinsmore & Shohl LLP

(57) ABSTRACT

A hybrid vehicle includes an engine, a first rotating electrical machine, a second rotating electrical machine, a pair of power lines, a first inverter, a second inverter, a battery, a converter, a voltage sensor, and an electronic control unit. The electronic control unit is configured to determine that the voltage sensor is normal and perform a first evacuation running control when an output of the voltage sensor changes by the predetermined value or more while a voltage change process is carried out. The electronic control unit is configured to control the converter to a gate shutoff state, control a motive power of the engine in such a manner as to rotate the first rotating electrical machine and put the first rotating electrical machine into a regeneration state, and control the second rotating electrical machine to a power running state, as the first evacuation running control.

2 Claims, 12 Drawing Sheets

FIG. 9

| EVACUATION RUNNING | EVACUATION RUNNING DISTANCE | ACCELERATION | MAXIMUM SPEED | EVACUATION RUNNING PERFORMANCE | EXECUTION ENABLING CONDITION |
|---|---|---|---|---|---|
| MD RUNNING | × | ○ | △ | × | – |
| VH-F/B RUNNING | ○ | ○ | ◎ | ○ | VH SENSOR NORMAL |
| UPPER ARM-ON RUNNING | ◎ | ○ | ◎ | ○ | CONVERTER NORMAL |

HYBRID VEHICLE

CROSS-REFERENCE TO RELATED APPLICATIONS

This application claims priority to Japanese Patent Application No. 2016-052816 filed on Mar. 16, 2016, the entire contents of which are hereby incorporated by reference.

BACKGROUND

1. Technical Field

Present disclosure relates to a hybrid vehicle that can run through the use of the motive power of at least one of an engine and a rotating electrical machine.

2. Description of Related Art

In Japanese Patent Application Publication No. 2009-60726 (JP 2009-60726 A), there is disclosed a hybrid vehicle that is equipped with an engine, a first rotating electrical machine that generates power through the use of motive power transmitted from the engine via a planetary gear mechanism, a second rotating electrical machine that is connected to a driving wheel, a first inverter for driving the first rotating electrical machine, a second inverter for driving the second rotating electrical machine, a pair of power lines that are connected to the first inverter and the second inverter, a step-up converter that carries out voltage conversion between the pair of the power lines and a battery, and a voltage sensor that detects a system voltage as a voltage between the pair of the power lines.

When the voltage sensor that detects the system voltage outputs an abnormal value, this hybrid vehicle shuts down the step-up converter, stops the engine, and runs in an evacuating manner through the use of the motive power of the second rotating electrical machine.

SUMMARY

In the hybrid vehicle disclosed in Japanese Patent Application Publication No. 2009-60726 (JP 2009-60726 A), when the voltage sensor that detects the system voltage outputs an abnormal value, the hybrid vehicle runs in an evacuating manner through the use of the second rotating electrical machine with the engine stopped. Therefore, power generation of the first rotating electrical machine through the use of the motive power of the engine (hereinafter referred to also as "engine power generation") cannot be carried out, and only the battery serves as a power supply source of the second rotating electrical machine. As a result, there is an apprehension that the evacuation running distance may become short.

On the other hand, when engine power generation is carried out with the upper arm of the step-up converter off (in a non-energization state), the battery is not charged with the power generated through engine power generation. Therefore, the system voltage (i.e., the voltage that is applied to the second rotating electrical machine) can change to a value that is higher than an output voltage of the battery. Therefore, in order to appropriately control the second rotating electrical machine while carrying out engine power generation with the upper arm of the step-up converter off, the voltage sensor needs to be normal and correctly detect the system voltage. However, when the voltage sensor outputs an abnormal value, it is unclear whether the factor therein is an abnormality in the step-up converter (i.e., the voltage sensor is normal) or an abnormality in the voltage sensor. Conventionally, there is no means for determining whether or not the voltage sensor is normal when the voltage sensor outputs an abnormal value. Therefore, there is no choice but to stop the engine with a view to ensuring the controllability of the second rotating electrical machine during evacuation running.

The present disclosure provides a hybrid vehicle that enables evacuation running through the use of the motive power of an engine while ensuring the controllability of a second rotating electrical machine, when a voltage sensor that detects a system voltage outputs an abnormal value.

A hybrid vehicle according to one aspect of the present disclosure includes an engine, a first rotating electrical machine, a second rotating electrical machine, a pair of power lines, a first inverter, a second inverter, a battery, a converter, a voltage sensor, and an electronic control unit. The first rotating electrical machine is connected to the engine. The second rotating electrical machine is connected to a driving wheel. The first inverter is electrically connected to the pair of the power lines and the first rotating electrical machine. The second inverter is electrically connected to the pair of the power lines and the second rotating electrical machine. The converter is electrically connected to the battery and the pair of the power lines. The voltage sensor is configured to detect a system voltage as a voltage between the pair of the power lines. The electronic control unit is configured to control the engine, the converter, the first inverter and the second inverter. The electronic control unit is configured to control the converter, the first inverter and the second inverter to a gate shutoff state when the voltage sensor outputs an abnormal value, as a shutdown process. The electronic control unit is configured to control a motive power of the engine in such a manner as to change a counter-electromotive voltage of the first rotating electrical machine by a predetermined value or more by changing a rotational speed of the first rotating electrical machine while the shutdown process is carried out, as a voltage change process. The electronic control unit is configured to determine that the voltage sensor is normal and perform a first evacuation running control when an output of the voltage sensor changes by the predetermined value or more while the voltage change process is carried out. The electronic control unit is configured to control the converter to the gate shutoff state, control the motive power of the engine in such a manner as to rotate the first rotating electrical machine and put the first rotating electrical machine into a regeneration state, and control the second rotating electrical machine to a power running state, as the first evacuation running control.

With the hybrid vehicle according to the aforementioned aspect of the present disclosure, when the voltage sensor outputs an abnormal value, the electronic control unit carries out the shutdown process. During the shutdown process, the converter is put into the gate shutdown state to shut off a current path in the direction from the side of the pair of the power lines toward the battery side, and the respective inverters are put into the gate shutoff state to stop electric control of the respective rotating electrical machines. Therefore, when the first rotating electrical machine generates a counter-electromotive voltage during the shutdown process, the system voltage changes as the counter-electromotive voltage of the first rotating electrical machine changes. While this shutdown process is carried out, the electronic control unit carries out the voltage change process for controlling the motive power of the engine in such a manner as to change the counter-electromotive voltage of the first rotating electrical machine by the predetermined value or more. When the output of the voltage sensor changes by the predetermined value or more through the voltage change process, the voltage sensor is assumed to correctly detect the change in the system voltage, so the electronic control unit determines that the voltage sensor is normal. As described hitherto, when the voltage sensor outputs an abnormal value, it can be determined, through the use of the counter-electromotive voltage of the first rotating electrical machine, whether or not the voltage sensor is normal.

Then, in the case where the voltage sensor is normal, even when the system voltage (the voltage that is applied to the second rotating electrical machine) changes through engine power generation, the change can be correctly detected by the voltage sensor, and the controllability of the second rotating electrical machine can be ensured. Therefore, the electronic control unit performs first evacuation running control that is concomitant with engine power generation. As a result, when the voltage sensor that detects the system voltage outputs an abnormal value, evacuation running through the use of the motive power of the engine can be carried out while ensuring the controllability of the second rotating electrical machine.

In the hybrid vehicle according to the aforementioned aspect of the present disclosure, the pair of the power lines may be a pair of a positive electrode line and a negative electrode line that is connected to a negative electrode of the battery. The converter may have an upper aim that is connected to the positive electrode line as one of the pair of the power lines and a positive electrode of the battery. The electronic control unit may be configured to control the engine in such a manner as to change a rotational speed of the engine from a first speed to a second speed, as the voltage change process. The electronic control unit may be configured to determine that the voltage sensor is abnormal and carry out a second evacuation running at least either in a case where an estimated value of the system voltage at a time when the rotational speed of the engine is equal to the first speed is different from an output of the voltage sensor or in a case where an estimated value of the system voltage at a time when the rotational speed of the engine is equal to the second speed is different from the output of the voltage sensor, while the voltage change process is carried out. The electronic control unit may be configured to control the upper arm of the converter to a conductive state, control the motive power of the engine in such a manner as to rotate the first rotating electrical machine and put the first rotating electrical machine into the regeneration state, and control the second rotating electrical machine to the power running state, as the second evacuation running.

With the hybrid vehicle according to the aforementioned aspect of the present disclosure, when the estimated value of the system voltage is different from the output of the voltage sensor during the voltage change process, the electronic control unit determines that the voltage sensor is abnormal. When the voltage sensor is abnormal, the converter is assumed to be normal, so the electronic control unit carries out second evacuation running for putting the upper arm of the converter into the conductive state while carrying out engine power generation. Thus, it is possible not only to supply the power obtained through engine power generation to the second rotating electrical machine, but also to charge the battery with this power. Therefore, the evacuation running distance can be made much longer than in the case where first evacuation running is carried out.

BRIEF DESCRIPTION OF THE DRAWINGS

Features, advantages, and technical and industrial significance of an exemplary embodiment of the present disclosure will be described below with reference to the accompanying drawings, in which like numerals denote like elements, and wherein:

FIG. 9 is a view comparing characteristics of evacuation running;

DETAILED DESCRIPTION OF EMBODIMENT

Figure 1:
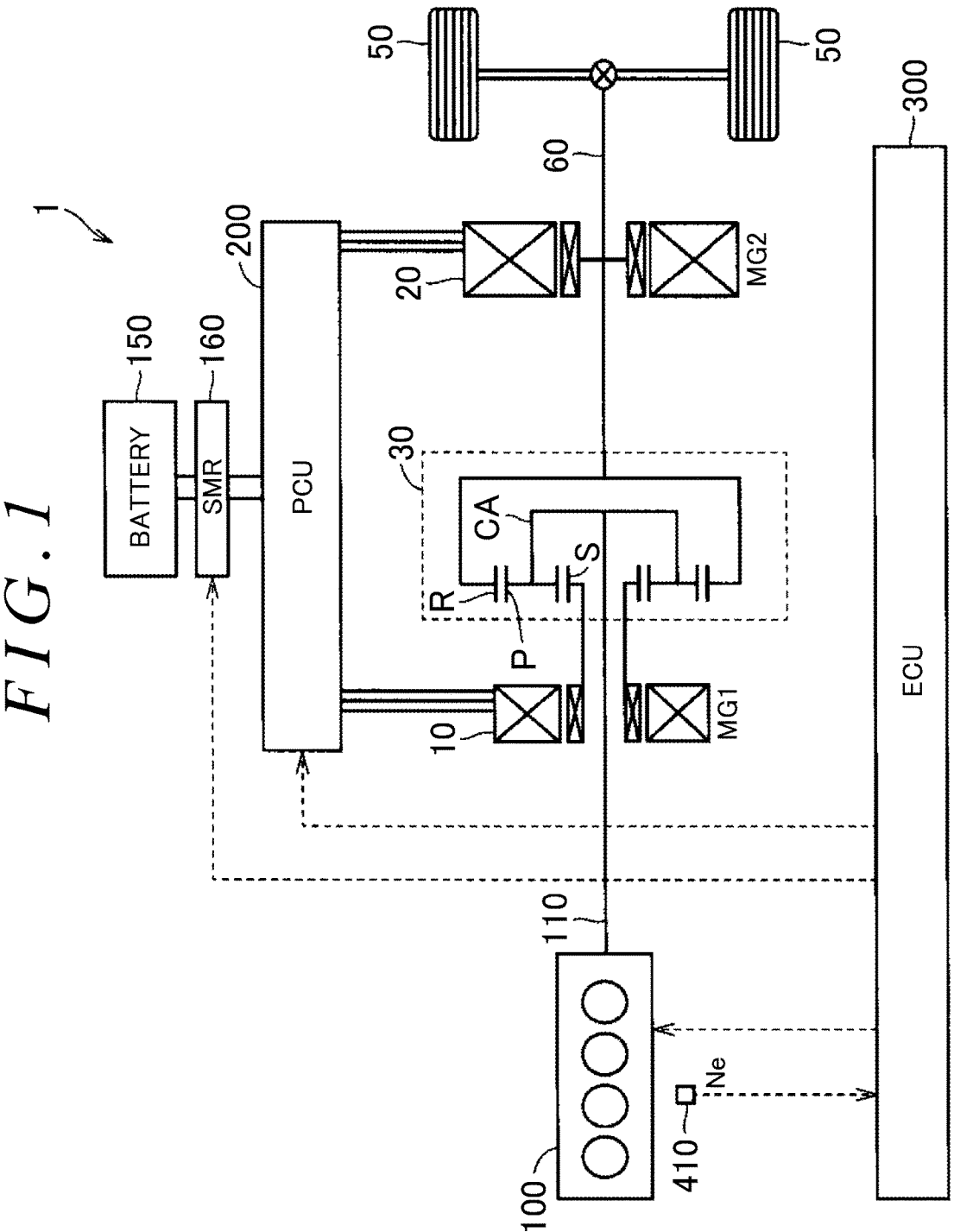
FIG. 1 is a view schematically showing the overall configuration of a vehicle.

The embodiment of the present disclosure will be described hereinafter in detail with reference to the drawings. Incidentally, like or equivalent components in the drawings are denoted by the same reference symbols respectively, and description thereof will not be repeated.

(Overall Configuration of Vehicle)

FIG. 1 is a view schematically showing an overall configuration of a vehicle 1 according to the embodiment of the present disclosure. The vehicle 1 is equipped with an engine 100, a motor-generator 10 (a first rotating electrical machine that will be referred to hereinafter also as "a first MG 10"), a motor-generator 20 (a second rotating electrical machine that will be referred to hereinafter also as "a second MG 20"), a planetary gear mechanism 30, driving wheels 50, an output shaft 60 that is connected to the driving wheels 50, a battery 150, a system main relay (an SMR) 160, a power control unit (a PCU) 200, and an electronic control unit (an ECU) 300.

The vehicle 1 is a hybrid vehicle that runs by transmitting the motive power of at least one of the engine 100 and the second MG 20 to the driving wheels 50. During normal running that will be described later, the vehicle 1 can change over a running mode between electric vehicle running (hereinafter referred to as "EV running") in which the vehicle runs through the use of the motive power of the second MG 20 without using the motive power of the engine 100, and hybrid vehicle running (hereinafter referred to as "HV running") in which the vehicle runs through the use of both the motive power of the engine 100 and the motive power of the second MG 20.

The engine 100 is an internal combustion engine such as a gasoline engine, a diesel engine or the like. The engine 100 generates a motive power for causing the vehicle 1 to run in accordance with a control signal from the ECU 300. The motive power generated by the engine 100 is output to the planetary gear mechanism 30.

The engine 100 is provided with an engine rotational speed sensor 410. The engine rotational speed sensor 410 detects a rotational speed of the engine 100, and outputs a signal indicating a detection result thereof to the ECU 300.

Both the first MG 10 and the second MG 20 are permanent magnet-type three-phase AC synchronous motors. A rotor of the first MG 10 and a rotor of the second MG 20 are fitted with permanent magnets 11 and 21 (see FIG. 2) respectively.

The rotor of the first MG 10 is connected to the engine 100 via the planetary gear mechanism 30. The first MG 10 can generate power through the use of the motive power of the engine 100. Power generation by the first MG 10 through the use of the motive power of the engine 100 will be referred to hereinafter also as "engine power generation". The AC power generated by the first MG 10 is converted into a DC power by the PCU 200, and the battery 150 is charged with this DC power. Besides, the AC power generated by the first MG 10 may be supplied to the second MG 20.

When there is a request to start the engine 100, the first MG 10 can generate a torque for cranking the engine 100 through the use of the power of the battery 150. Incidentally, the vehicle 1 is not equipped with a so-called starter that generates a torque for cranking the engine through the use of the power of an auxiliary battery (not shown).

The rotor of the second MG 20 is coupled to the output shaft 60. The second MG 20 rotates the output shaft 60 through the use of a power that is supplied from at least one of the battery 150 and the first MG 10. Besides, the second MG 20 can also generate power through regenerative braking. The AC power generated by the second MG 20 is converted into a DC power by the PCU 200, and the battery 150 is charged with this DC power.

The planetary gear mechanism 30 is a single pinion-type planetary gear mechanism. Incidentally, the planetary gear mechanism 30 is not absolutely required to be a single pinion-type planetary gear mechanism, but may be a double pinion-type planetary gear mechanism.

The planetary gear mechanism 30 mechanically couples the engine 100, the first MG 10 and the output shaft 60 to one another. In concrete terms, the planetary gear mechanism 30 includes a sun gear S that is coupled to the rotor of the first MG 10, a ring gear R that is coupled to the output shaft 60, a carrier CA that is coupled to a crankshaft 110 of the engine 100, and a pinion gear P that meshes with the sun gear S and the ring gear R, as rotary elements. The carrier CA holds the pinion gear P such that the pinion gear P can rotate around its own axis and around the carrier CA. The output shaft 60 is connected to the right and left driving wheels 50 via a differential gear, and is directly coupled to the second MG 20 as described above. Accordingly, the ring gear R, the second MG 20, the output shaft 60 and the driving wheels 50 rotate in synchronization with one another.

In some cases, a rotational speed of the engine 100 will be referred to hereinafter as "an engine rotational speed Ne", a rotational speed of the first MG 10 will be referred to hereinafter as "a first MG rotational speed Nm1", and a rotational speed of the second MG 20 will be referred to hereinafter as "a second MG rotational speed Nm2". Besides, in some cases, an output torque of the engine 100 will be referred to hereinafter as "an engine torque Te", an output torque of the first MG 10 will be referred to hereinafter as "a first MG torque Tm1", and an output torque of the second MG 20 will be referred to hereinafter as "a second MG torque Tm2".

The battery 150 is a lithium-ion secondary battery configured in a rechargeable manner. Incidentally, the battery 150 may be another secondary battery such as a nickel hydride secondary battery or the like.

The SMR 160 is directly connected to the power line between the battery 150 and the PCU 200. The SMR 160 makes a changeover between a conductive state of the battery 150 and the PCU 200 and a shutoff state of the battery 150 and the PCU 200, in accordance with a control signal from the ECU 300. Incidentally, the SMR 160 is held in the conductive state during normal running and evacuation running that will be described later.

The PCU 200 steps up a DC voltage input from the battery 150, converts the stepped-up voltage into an AC voltage, and supplies this AC voltage to the first MG 10 and the second MG 20. Besides, the PCU 200 converts the AC power generated by the first MG 10 and the second MG 20 into a DC power, and supplies this DC power to the battery 150. The configuration of the PCU 200 will be described in detail with reference to FIG. 2.

Although not shown in the drawing, the ECU 300 is configured to include a central processing unit (a CPU), a memory, input/output buffers and the like. The ECU 300 controls the outputs of the engine 100, the first MG 10 and the second MG 20 such that the vehicle 1 runs in a desired running state, based on signals from various sensors and components, and a map and a program that are stored in the memory.

(Configuration of Electric System And ECU)

Figure 2:
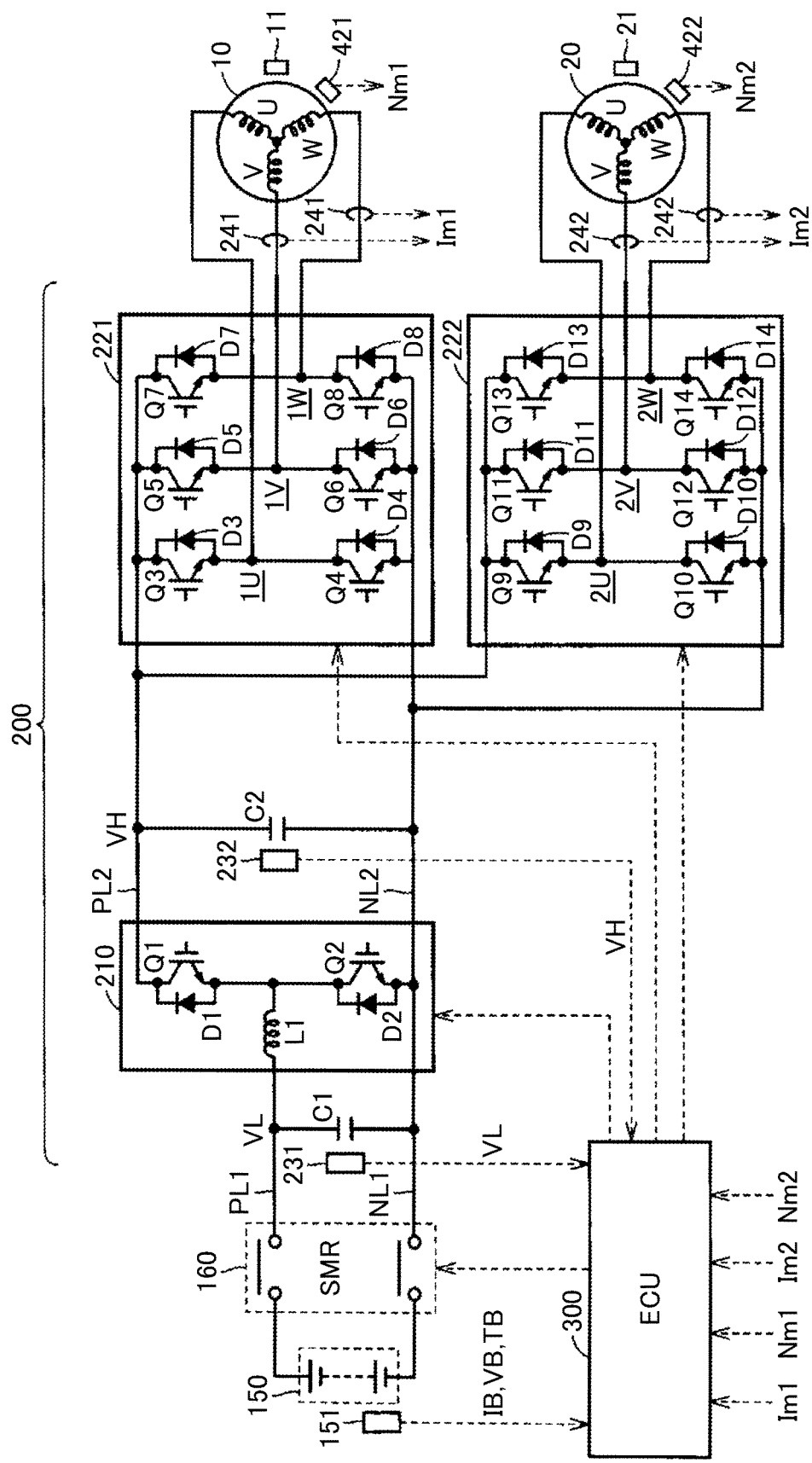
FIG. 2 is a circuit block diagram for explaining the configuration of an electric system.

FIG. 2 is a circuit block diagram for explaining the configuration of the electric system of the vehicle 1. The electric system of the vehicle 1 includes the battery 150, the SMR 160, the PCU 200, the first MG10, the second MG 20, and the ECU 300. The PCU 200 includes a converter 210, a pair of power lines PL1 and NL1 (a positive electrode line PL1 and a negative electrode line NL1), a pair of power lines PL2 and NL2 (a positive electrode line PL2 and a negative electrode line NL2), capacitors C1 and C2, a first inverter 221, a second inverter 222, and voltage sensors 231 and 232.

The pair of the power lines PL1 and NL1 are connected to the battery 150 via the SMR 160. The capacitor C1 is connected between the pair of the power lines PL1 and NL1, and smoothens a voltage VL between the pair of the power lines PL1 and NL1. The voltage sensor 231 detects a voltage between both ends of the capacitor C1, namely, the voltage VL between the pair of the power lines PL1 and NL1. The voltage VL detected by the voltage sensor 231 will be referred to hereinafter also as "a VL sensor value".

The converter 210 is electrically connected to the pair of the power lines PL1 and NL1 and the pair of the power lines PL2 and NL2. Incidentally, the negative electrode line NL1 and the negative electrode line NL2 are directly coupled to each other, and hence have the same potential.

The converter 210 includes a reactor L1, a switching element Q1 (an upper arm), a switching element Q2 (a lower arm), and diodes D1 and D2. Each of the switching elements Q1 and Q2 and later-described switching elements Q3 to Q14 is, for example, an insulated gate bipolar transistor (an IGBT). The switching elements Q1 and Q2 are connected in series between the pair of the power lines PL2 and NL2. The diodes D1 and D2 are connected in an antiparallel manner between collectors and emitters of the switching elements Q1 and Q2 respectively. The reactor L1 is connected at one end thereof to a high potential side of the battery 150 via the power line PL1. The reactor L1 is connected at the other end thereof to a connection node of the switching element Q1 and the switching element Q2. Accordingly, the switching element Q1 is connected at one end thereof to the positive electrode line PL2, and the switching element Q1 is connected at the other end thereof to a positive electrode terminal of the battery 150 via the reactor L1, the positive electrode line PL1 and the SMR 160.

The converter 210 steps up a voltage that is input from the pair of the power lines PL1 and NL1, and outputs the stepped-up voltage to the pair of the power lines PL2 and NL2, through switching operation corresponding to a step-up control signal from the ECU 300. Besides, the converter 210 steps down a voltage that is input from the pair of the power lines PL2 and NL2, and outputs the stepped-down voltage to the pair of the power lines PL1 and NL1, through switching operation corresponding to a step-down control signal from the ECU 300.

The capacitor C2 is connected between the pair of the power lines PL2 and NL2, and smoothens a voltage between the pair of the power lines PL2 and NL2. The voltage sensor 232 detects a voltage between both ends of the capacitor C2, namely, a voltage between the pair of the power lines PL2 and NL2 (hereinafter referred to also as "a system voltage") VH, and outputs a detection result thereof to the ECU 300. The system voltage VH detected by the voltage sensor 232 will be referred to hereinafter also as "a VH sensor value", and the voltage sensor 232 will be referred to hereinafter also as "a VH sensor 232".

When the system voltage VH is supplied to the first inverter 221, the first inverter 221 converts a DC voltage into an AC voltage, and drives the first MG 10. The first inverter 221 includes the six switching elements Q3 to Q8, and diodes D3 to D8 that are connected in an antiparallel manner between collectors and emitters of the switching elements Q3 to Q8 respectively.

Each of the six switching elements Q3 to Q8 constitutes a three-phase drive arm having an upper arm and a lower arm. In concrete terms, the first inverter 221 includes a U-phase arm 1U, a V-phase arm 1V, and a W-phase arm 1W. The U-phase arm 1U has the switching element Q3 (the upper arm) and the switching element Q4 (the lower arm), which are connected in series to each other. The V-phase arm 1V has the switching element Q5 (the upper arm) and the switching element Q6 (the lower arm), which are connected in series to each other. The W-phase arm 1W has the switching element Q7 (the upper arm) and the switching element Q8 (the lower arm), which are connected in series to each other.

The second inverter 222 includes respective phase arms 2U to 2W, the switching elements Q9 to Q14, and diodes D9 to D14. Incidentally, the configuration of the second inverter 222 is basically identical to the configuration of the first inverter 221, so description thereof will not be repeated.

The first MG 10 and the second MG 20 are provided with resolvers 421 and 422 respectively. The resolver 421 detects a first MG rotational speed Nm1. The resolver 422 detects a second MG rotational speed Nm2. The first MG 10 and the second MG 20 are provided with current sensors 241 and 242 respectively. The current sensor 241 detects a current Im1 flowing through the first MG 10. The current sensor 242 detects a current Im2 flowing through the second MG 20.

The battery 150 is provided with a monitoring unit 151. The monitoring unit 151 detects a voltage (a battery voltage) VB of the battery 150, a current (a battery current) IB flowing through the battery 150, and a temperature (a battery temperature) TB of the battery 150.

The ECU 300 controls the PCU 200 (the converter 210, the first inverter 221 and the second inverter 222) such that the output of each of the first MG 10 and the second MG 20 becomes equal to a desired output, based on information from the respective sensors and the like.

(Evacuation Running at Time of VH Abnormality)

The ECU 300 can cause the vehicle 1 to run in a normal mode. The normal mode is a mode in which the vehicle 1 is caused to run while making a changeover between the above-mentioned EV running and the above-mentioned HV running as necessary. Running in the normal mode will be referred to also as "normal running".

The ECU 300 determines whether or not an abnormality as the outputting of an abnormal value by the VH sensor 232 (hereinafter referred to also as "an VH abnormality") has occurred during normal running. The VH abnormality includes a divergence abnormality, an overvoltage abnormality and the like. The divergence abnormality means that a system voltage VH (hereinafter referred to also as "a VH estimated value") that is estimated from a VL sensor value and a control signal of the converter 210 is divergent from a VH sensor value by a predetermined value or more. The overvoltage abnormality means that the VH sensor value exceeds an overvoltage threshold determined in advance.

When a VH abnormality occurs during normal running, the ECU 300 makes a changeover from the normal mode to an evacuation mode, and causes the vehicle 1 to run in an evacuating manner. Running in the evacuation mode includes motor drive running (hereinafter referred to also as "MD running"), system voltage feedback running (hereinafter referred to also as "VH-F/B running"), and upper arm-on running.

<<MD Running>>

Figure 3:
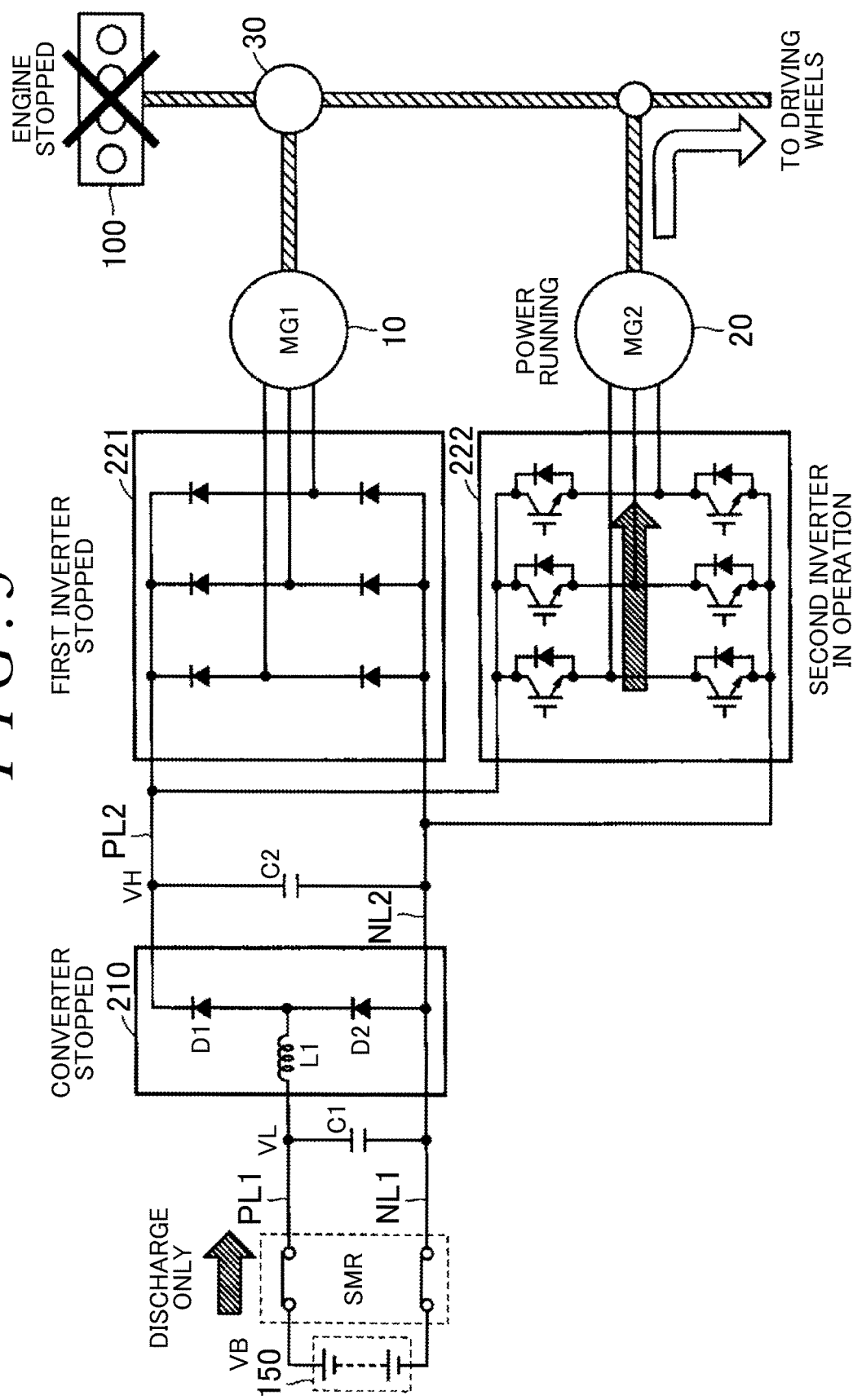
FIG. 3 is a view schematically showing a control state during MD running.

FIG. 3 is a view schematically showing control states of the engine 100, the converter 210, the first inverter 221 and the second inverter 222 during MD running. During MD running, the ECU 300 stops the converter 210, the first inverter 221 and the engine 100, operates the second inverter 222, and puts the second MG 20 into a power running state.

When the converter 210 is stopped (when the gate thereof is shut off), a current in a direction from the power line PL2 toward the power line PL1 (a direction in which the battery 150 is charged) is shut off by the diode D1. Therefore, the battery 150 can only be discharged.

Besides, the engine 100 and the first inverter 221 are stopped, so engine power generation by the first MG 10 is not carried out. Accordingly, during MD running, the second MG 20 is driven only by the power discharged from the battery 150.

While the ECU 300 needs to correctly recognize the system voltage VH that is applied to the second MG 20 in order to accurately control the output of the second MG 20, it is also assumed at the time of the VH abnormality that the VH sensor 232 is abnormal (i.e., the VH sensor value does not correctly indicate the system voltage VH). However, during MD running, the converter 210 is stopped, and engine power generation is not carried out. Therefore, the system voltage VH is equal to the voltage VL and the battery voltage VB. Therefore, during MD running, the ECU 300 recognizes the battery voltage VB detected by the monitoring unit 151 as the system voltage VH, and controls the output of the second MG 20, without using the VH sensor value. Incidentally, in consideration of the fact that an abnormality in the VL sensor value that is used to calculate the VH estimated value may also be a factor in the VH abnormality, the ECU 300 recognizes the battery voltage VB detected by the monitoring unit 151 as the system voltage VH, instead of recognizing the VL sensor value as the system voltage VH.

Figure 4:
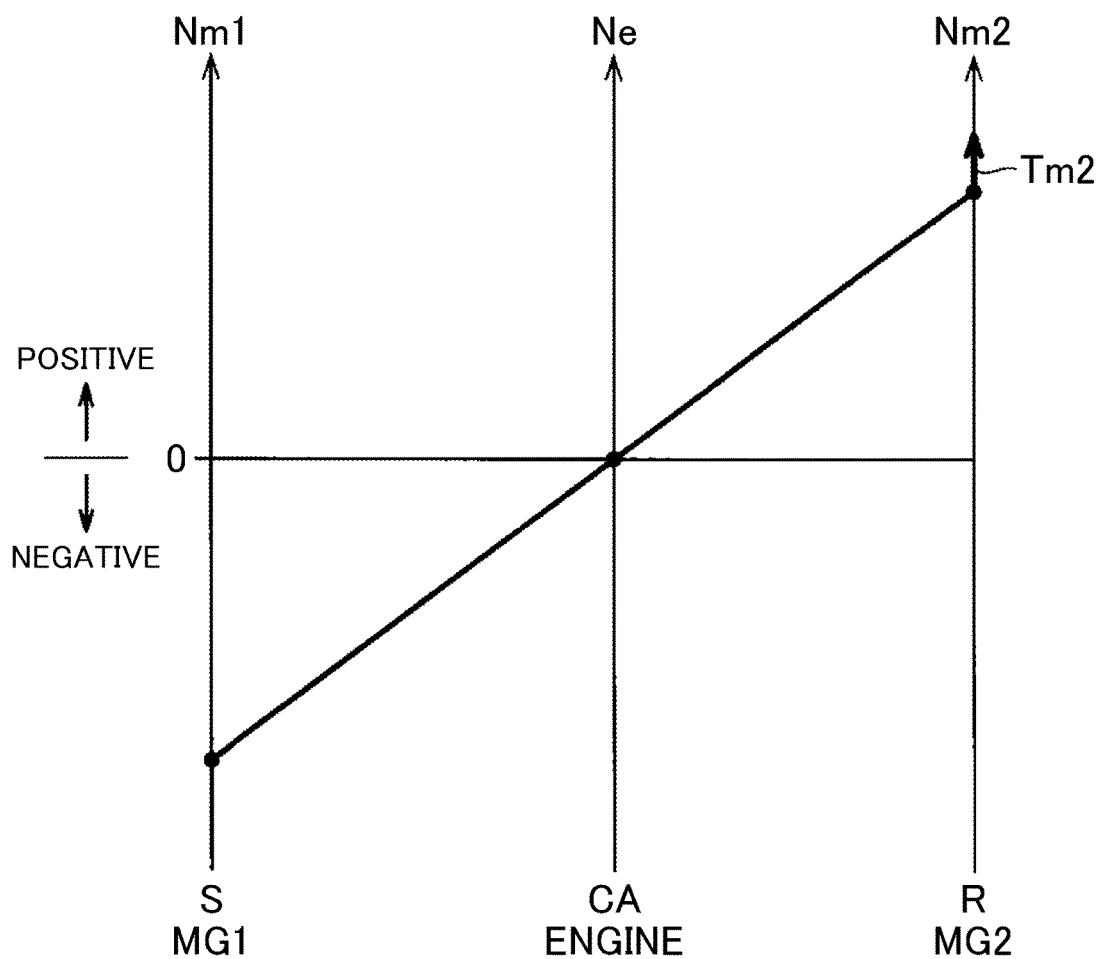
FIG. 4 is a view showing an exemplary rotation state during MD running on an alignment chart.

FIG. 4 is a view showing exemplary rotation states of the engine 100, the first MG 10 and the second MG 20 during MD running on an alignment chart of the planetary gear mechanism 30. Incidentally, in the alignment chart of the planetary gear mechanism 30, the sun gear S, the carrier CA and the ring gear R of the planetary gear mechanism 30 are indicated by vertical lines respectively, and the intervals among the vertical lines correspond to gear ratios of the planetary gear mechanism 30 respectively. Furthermore, the vertical direction of each of the vertical lines is a rotational direction, and a position in the vertical direction is a rotational speed. The planetary gear mechanism 30 is a single pinion-type planetary gear mechanism. Therefore, in the alignment chart of FIG. 4, the sun gear S that is connected to the first MG 10 is represented by the line at the left end, the carrier CA that is connected to the engine 100 is represented by the line at the center, and the ring gear R that is connected to the second MG 20 is represented by the line at the right end.

The planetary gear mechanism 30 is configured as described above, so there is established a relationship in which the first MG rotational speed Nm1, the engine rotational speed Ne and the second MG rotational speed Nm2 are linked with one another by a straight line on the alignment chart (hereinafter referred to also as "a relationship of the alignment chart"). According to the relationship of the alignment chart, when any two of the first MG rotational speed Nm1, the engine rotational speed Ne and the second MG rotational speed Nm2 are determined, the other rotational speed is also determined.

During MD running, the engine 100 and the first MG 10 output no torque, and the second MG 20 outputs the second MG torque Tm2 to the ring gear R, so the vehicle 1 is caused to run in an evacuating manner. Thus, the engine rotational speed Ne becomes equal to 0, and the second MG rotational speed Nm2 assumes a positive value. The first MG rotational speed Nm1 assumes a negative value as shown in FIG. 4, according to the relationship of the alignment chart.

<<VH-F/B Running>>

Figure 5:
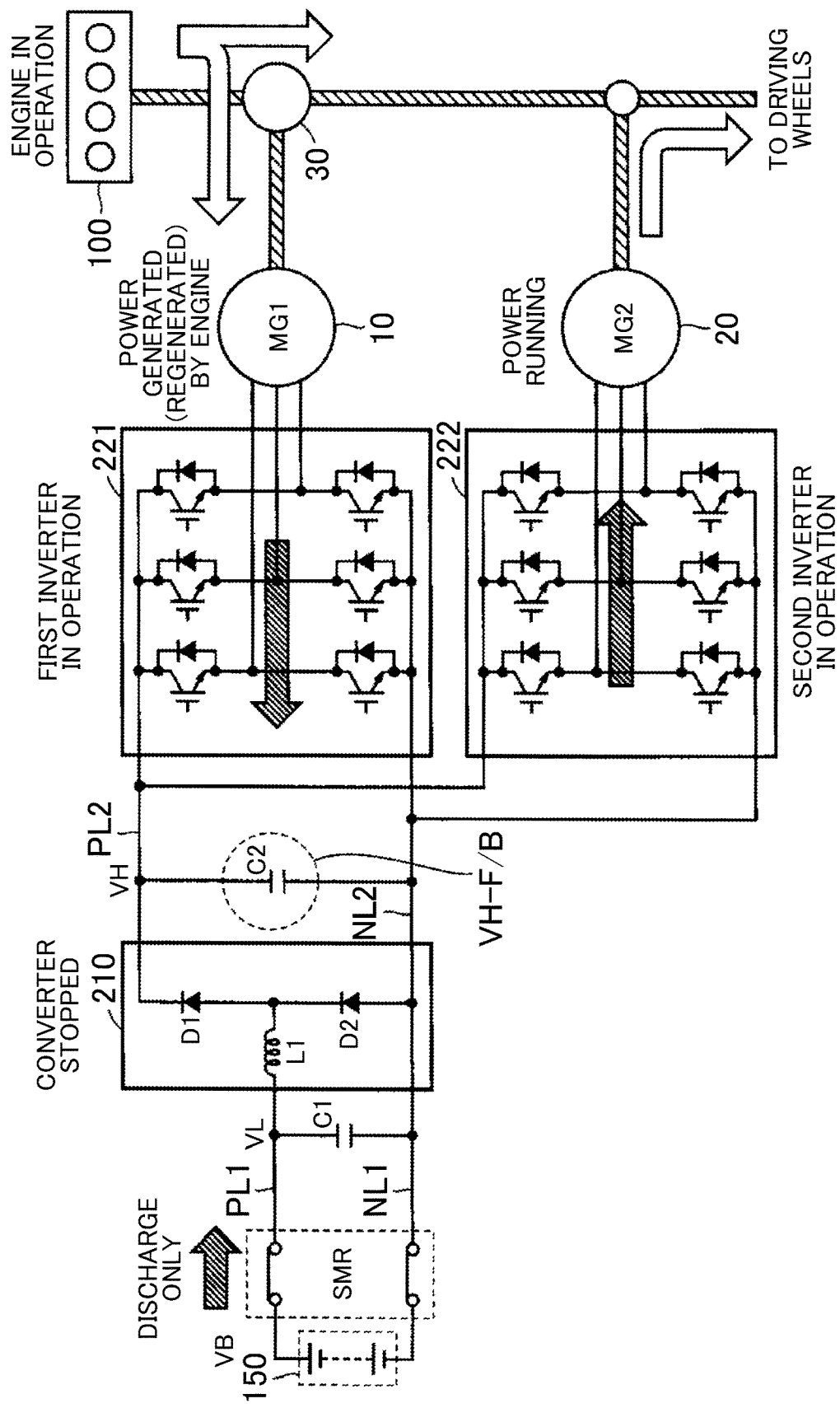
FIG. 5 is a view schematically showing a control state during VH-F/B running.

FIG. 5 is a view schematically showing control states of the engine 100, the converter 210, the first inverter 221 and the second inverter 222 during VH-F/B running. During VH-F/B running, the ECU 300 stops the converter 210, operates the engine 100 and the first inverter 221 to carry out engine power generation, and at the same time, operates the second inverter 222 to put the second MG 20 into the power running state.

During VH-FB running, the converter 210 is stopped, so the battery 150 can only be discharged. However, engine power generation by the first MG 10 is carried out. Therefore, the power obtained through engine power generation as well as the power discharged from the battery 150 can be supplied to the second MG 20. Therefore, the evacuation running distance can be made longer in VH-F/B running than in MD running. However, the system voltage VH may become higher than the battery voltage VB due to the influence of engine power generation, so the ECU 300 cannot recognize the battery voltage VB as the system voltage VH. Therefore, as will be described later, VH-F/B running is carried out only when it is determined that the VH sensor 232 is normal (the VH sensor value correctly indicates the system voltage VH). Then, during VH-F/B running, the ECU 300 recognizes the VH sensor value as the system voltage VH, and controls the output of the second MG 20, while performing feedback control of the output of the engine 100 and the first inverter 221 (the engine power generation amount) such that the VH sensor value becomes equal to a target voltage.

Figure 6:
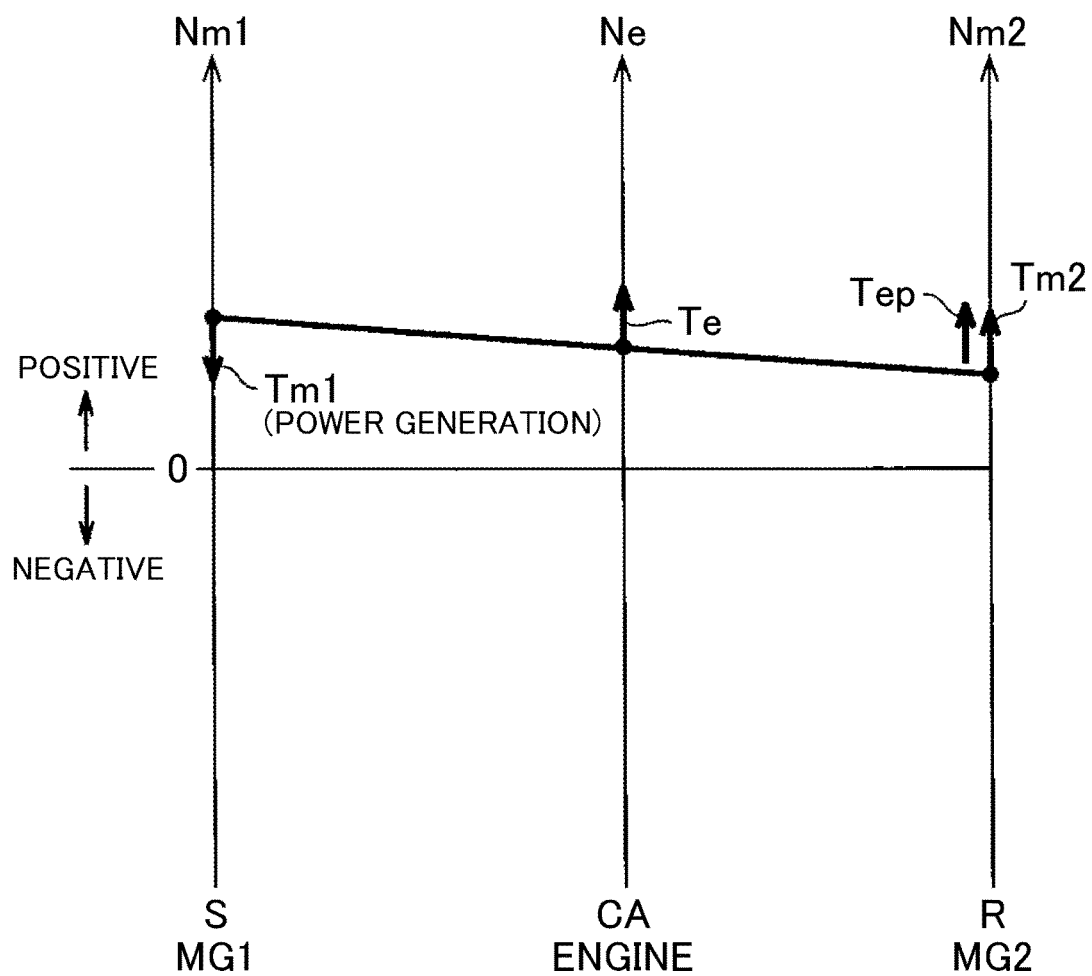
FIG. 6 is a view showing an exemplary rotation state during VH-F/B running on an alignment chart.

FIG. 6 is a view showing exemplary rotation states of the engine 100, the first MG 10 and the second MG 20 during VH-FB running on an alignment chart of the planetary gear mechanism 30. During VH-F/B running, the engine 100 outputs the engine torque Te in the positive direction to the carrier CA, and the first MG 10 outputs the first MG torque Tm1 in the negative direction to the sun gear S by carrying out engine power generation. Thus, the engine torque Te is transmitted to the ring gear R, using the first MG torque Tm1 as a reaction force. An engine torque that is transmitted to the ring gear R using the first MG torque Tm1 as a reaction force (hereinafter referred to also as "an engine directly-transmitted torque Tep") acts on the ring gear R in the positive direction (a forward direction).

Besides, the second MG 20 outputs the second MG torque Tm2 in the positive direction to the ring gear R. Therefore, during VH-F/B running, the vehicle 1 can run in an evacuating manner with a torque obtained by summating the engine directly-transmitted torque Tep and the second MG torque Tm2.

<<Upper Arm-On Running>>

Figure 7:
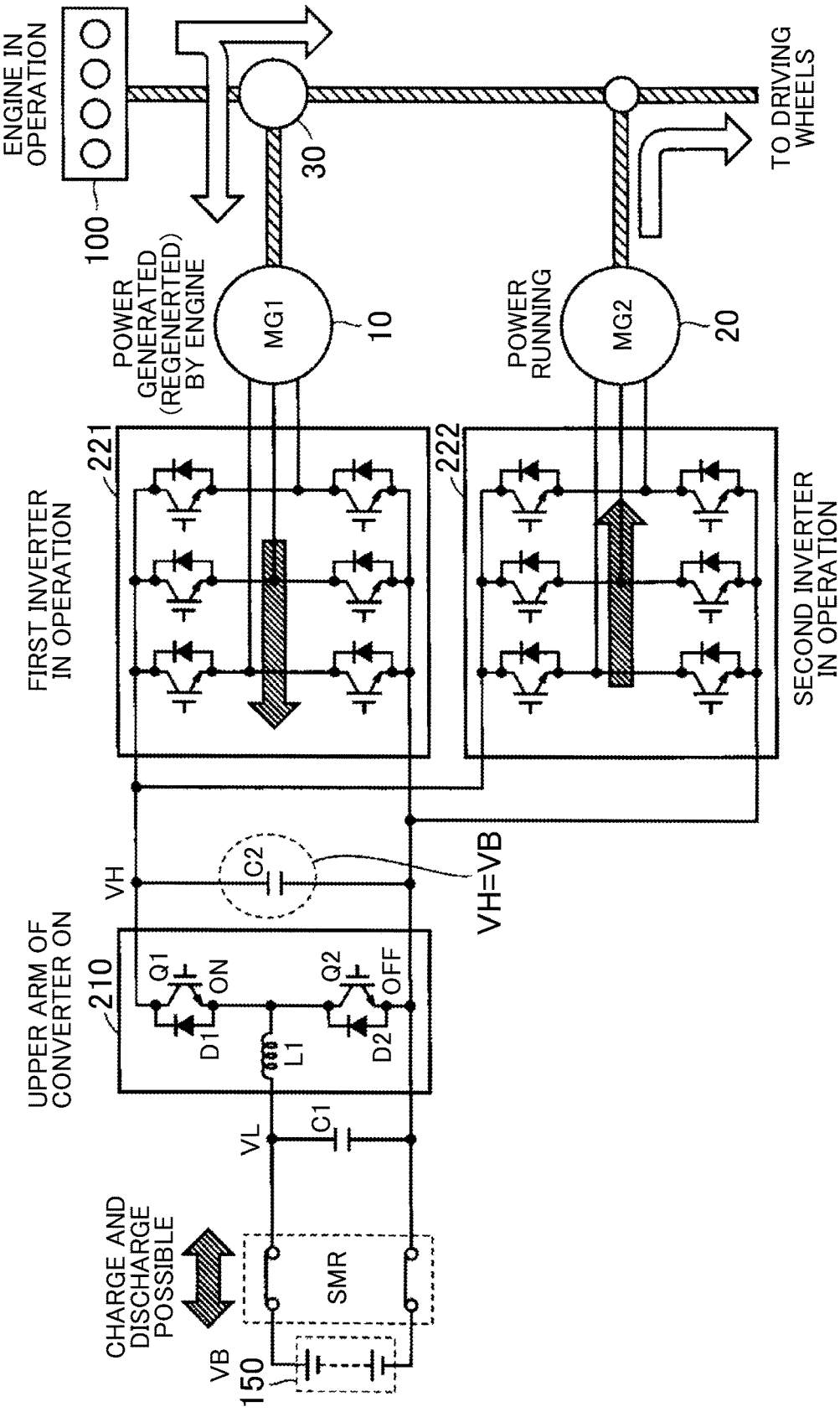
FIG. 7 is a view schematically showing a control state during upper arm-on running.

FIG. 7 is a view schematically showing control states of the engine 100, the converter 210, the first inverter 221 and the second inverter 222 during upper arm-on running. During upper arm-on running, the ECU 300 puts the converter 210 into an upper arm-on state, operates the engine 100 and the first inverter 221 to carry out engine power generation, and operates the second inverter 222 to put the second MG 20 into the power running state.

The upper arm-on state of the converter 210 is a state where the upper arm element Q1 of the converter 210 is held in an on state (a conductive state) and the lower aim element Q2 is held in an off state (a non-conductive state). Thus, although no voltage is stepped up or down by the converter 210, a current can flow in both directions between the power line PL1 and the power line PL2 via the upper arm element Q1, so the battery 150 can be charged and discharged.

Furthermore, during upper arm-on running, engine power generation is carried out. It is therefore possible not only to supply the power discharged from the battery 150 and the power obtained through engine power generation to the second MG 20, but also to charge the battery 150 with the power obtained through engine power generation. Therefore, the evacuation running distance can be made much longer in upper arm-on running than in VH-FB running.

Besides, during upper arm-on running, the upper arm element Q1 of the converter 210 is held in the conductive state, so the power line P1 and the power line PL2 are at the same potential. Therefore, the system voltage VH is equal to the voltage VL and the battery voltage VB. Therefore, during upper arm-on running, the ECU 300 can recognize the VL sensor value or the battery voltage VB detected by the monitoring unit 151 as the system voltage VH and accurately control the output of the second MG 20, without using the VH sensor value. Incidentally, in consideration of the fact that an abnormality in the VL sensor value that is used to calculate the VH estimated value may also be a factor in a VH abnormality, the ECU 300 recognizes the battery voltage VB detected by the monitoring unit 151 as the system voltage VH instead of recognizing the VL sensor value as the system voltage VH.

It should be noted, however, that since the converter 210 needs to be put into the upper arm-on state in order to carry out upper arm-on running, upper arm-on running is carried out only when it is determined that the converter 210 is normal, as will be described later.

Figure 8:
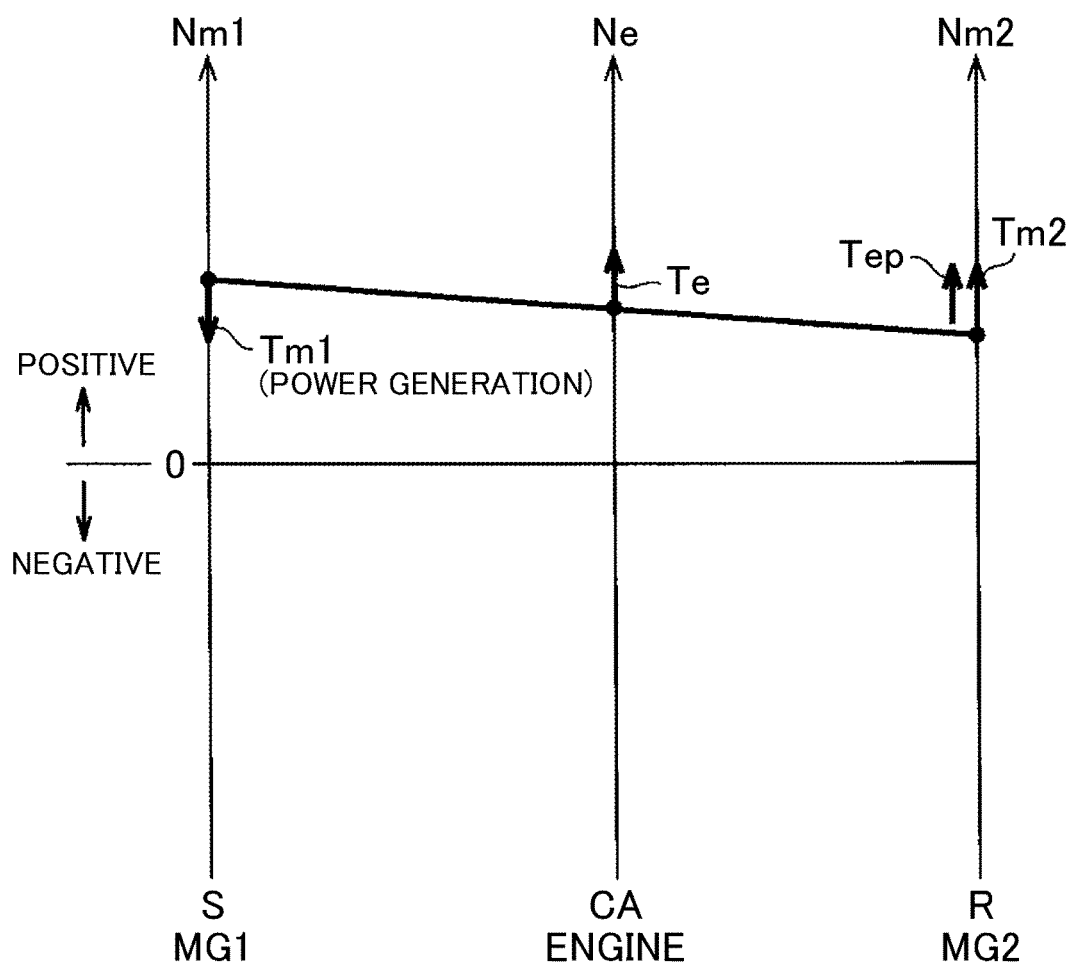
FIG. 8 is a view showing an exemplary rotation state during upper arm-on running on an alignment chart.

FIG. 8 is a view showing exemplary rotational states of the engine 100, the first MG 10 and the second MG 20 during upper arm-on running on an alignment chart. During upper arm-on running as well as VH-FB running, the engine 100 outputs the engine torque Te in the positive direction to the carrier CA, and the first MG 10 outputs the first MG torque Tm1 in the negative direction to the sun gear S by carrying out engine power generation. Besides, the second MG 20 outputs the second MG torque Tm2 in the positive direction to the ring gear R. Therefore, during upper arm-on running, the vehicle 1 is caused to run in an evacuating manner with a torque obtained by summating the engine directly-transmitted torque Tep and the second MG torque Tm2.

<Selection of Evacuation Running at Time of Occurrence of VH Abnormality>

FIG. 9 is a view comparing the characteristics of the above-mentioned three types of evacuation running (MD running, VH-F/B running and upper arm-on running) with one another. In FIG. 9, "double circles", "circles", "a triangle" and "crosses" indicate that the characteristics deteriorate in this order.

As for the evacuation running distance, the characteristics deteriorate in the order of upper arm-on running, VH-FB running and MD running. As for acceleration performance, all the three running modes are good and not so different from one another. As for the maximum speed, VH-F/B running and upper arm-on running have good characteristics, and MD running has bad characteristics.

Considering these facts comprehensively, it is safe to conclude that VH-F/B running and upper arm-on running have better evacuation running performance than MD running. Accordingly, when a VH abnormality occurs, it is desirable to carry out VH-F/B running or upper arm-on running instead of MD running.

However, in order to carry out VH-F/B running, the VH sensor value needs to correctly indicate the system voltage VH, that is, the VH sensor 232 needs to be normal, as described above. Besides, in order to carry out upper arm-on running, the converter 210 needs to be controlled to the upper arm-on state, that is, the converter 210 needs to be normal.

When the VH sensor 232 outputs an abnormal value during normal running, the ECU 300 determines that a VH abnormality has occurred. However, this determination alone cannot specify whether the VH sensor 232 is normal (i.e., the factor in the occurrence of a VH abnormality is an abnormality in the converter 210) or the VH sensor 232 is abnormal (the factor in the occurrence of a VH abnormality is an abnormality in the VH sensor 232 while the converter 210 is normal).

Thus, the ECU 300 according to the present embodiment of the present disclosure determines whether or not the VH sensor 232 is normal, according to the following procedure.

First of all, the ECU 300 performs a process (hereinafter referred to also as "a shutdown process") for stopping (shutting gates of) the converter 210, the first inverter 221 and the second inverter 222 all on the condition that the engine 100 be in operation.

Figure 10:
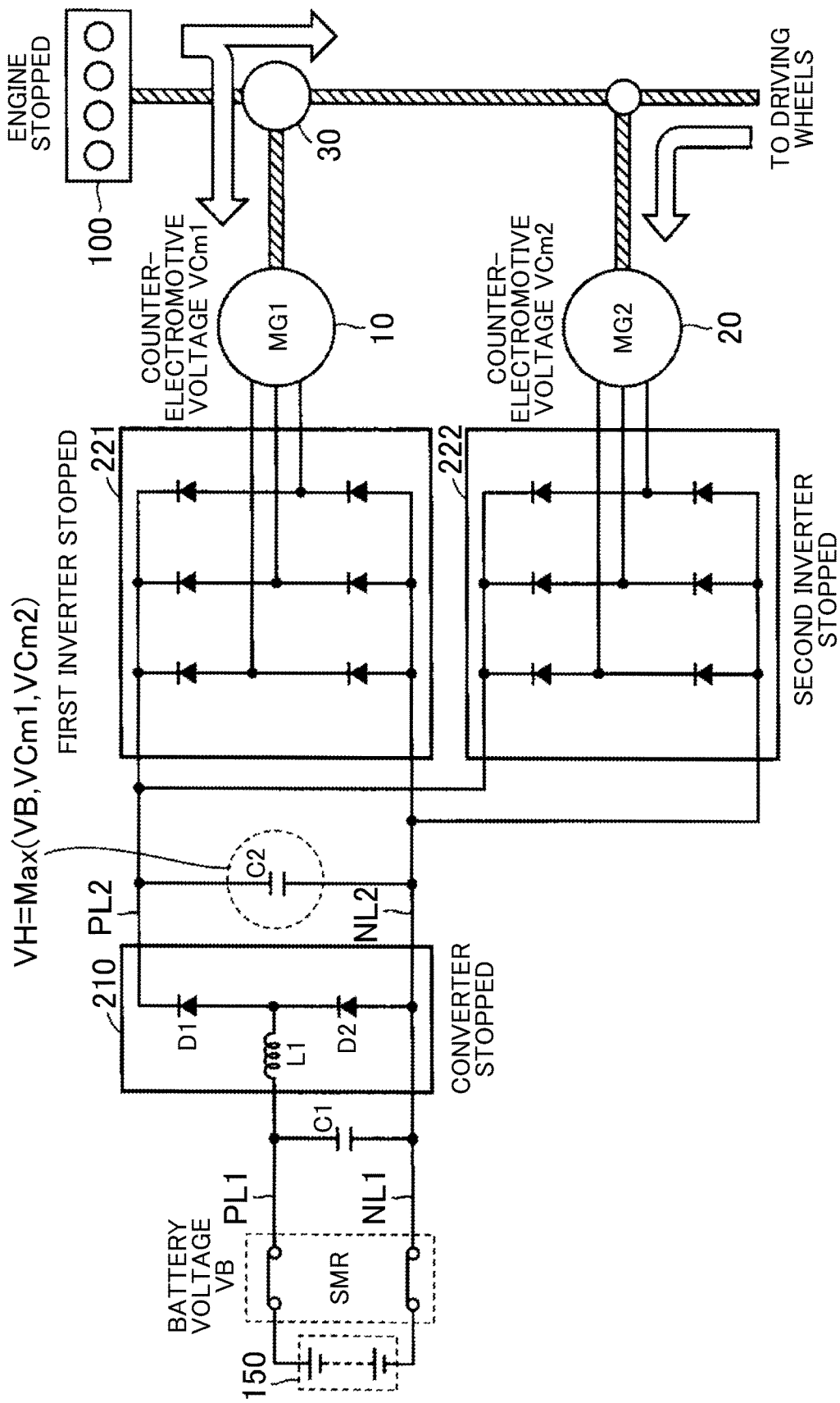
FIG. 10 is a view schematically showing a state during a shutdown process.

FIG. 10 is a view schematically showing states of the engine 100, the converter 210, the first inverter 221 and the second inverter 222 during the shutdown process.

During the shutdown process, the converter 210 is stopped. Thus, a current path in the direction from the power line PL2 toward the battery 150 is shut off, and the battery voltage VB can be applied to the pair of the power lines PL2 and NL2.

Besides, during the shutdown process, the first inverter 221 is stopped, so the first MG 10 is stopped from being electrically controlled. In this state, when the rotor of the first MG 10 that is fitted with a permanent magnet 11 (see FIG. 2) is mechanically rotated, the first MG 10 generates a counter-electromotive voltage (hereinafter referred to also as "an MG1 counter-electromotive voltage") VCm1 corresponding to the first MG rotational speed Nm1. The MG1 counter-electromotive voltage VCm1 can be applied to the power lines PL2 and NL2 via the first inverter 221.

By the same token, during the shutdown process, the second inverter 222 is stopped, so the second MG 20 is stopped from being electrically controlled. In this state, when the rotor of the second MG 20 that is fitted with a permanent magnet 21 (see FIG. 2) is mechanically rotated by the motive power from the driving wheels 50, the second MG 20 generates a counter-electromotive voltage (hereinafter referred to also as "an MG2 counter-electromotive voltage") VCm2 corresponding to the second MG rotational speed Nm2 (the vehicle speed). The MG2 counter-electromotive voltage VCm2 can be applied to the pair of the power lines PL2 and NL2 via the second inverter 222.

As described hitherto, during the shutdown process, a current path in the direction from the power line PL2 toward the battery 150 is shut off, and the battery voltage VB, the MG1 counter-electromotive voltage VCm1 and the MG2 counter-electromotive voltage VCm2 can be applied to the pair of the power lines PL2 and NL2. Accordingly, the system voltage VH is equal to the highest of the battery voltage VB, the MG1 counter-electromotive voltage VCm1 and the MG2 counter-electromotive voltage VCm2, as indicated by an expression (1) shown below.

$$VH = \text{Max}(VB, VCm1, VCm2) \qquad (1)$$

Therefore, during the shutdown process, when the MG1 counter-electromotive voltage VCm1 is higher than the battery voltage VB and the MG2 counter-electromotive voltage VCm2, the system voltage VH changes as the MG1 counter-electromotive voltage VCm1 changes.

In view of this point, the ECU 300 carries out a process (hereinafter referred to also as "a counter-electromotive voltage change process") for changing the MG1 counter-electromotive voltage VCm1 by a predetermined value or more by changing the first MG rotational speed Nm1 through the use of the motive power of the engine 100, during the shutdown process.

Figure 11:
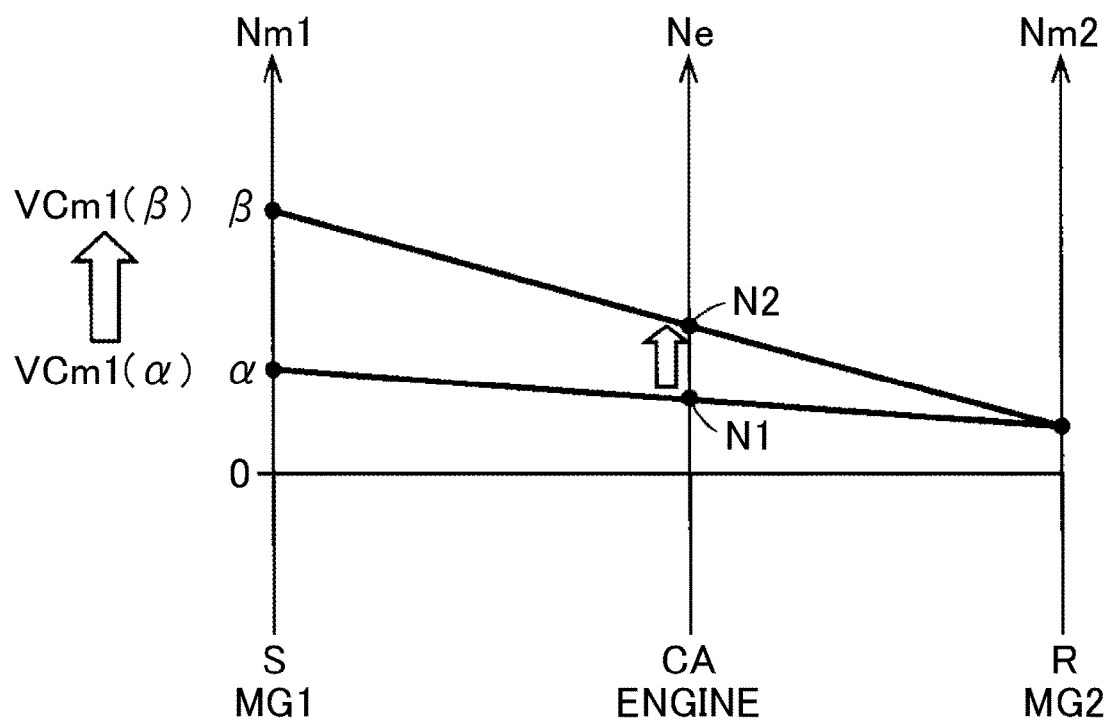
FIG. 11 is a view showing exemplary changes in an engine rotational speed Ne and a first MG rotational speed Nm 1 due to a counter-electromotive voltage change process on an alignment chart.

FIG. 11 is a view showing exemplary changes in the engine rotational speed Ne and the first MG rotational speed Nm1 through the counter-electromotive voltage change process on an alignment chart of the planetary gear mechanism 30. The ECU 300 increases the engine rotational speed Ne from a first target speed N1 to a second target speed N2 through the counter-electromotive voltage change process. In this case, the inertia of the vehicle 1 is large, and the vehicle speed (the second MG rotational speed Nm2) hardly changes. Therefore, according to the relationship of the alignment chart, the first MG rotational speed Nm1 is increased from a predetermined value $\alpha$ to a predetermined value $\beta$. The MG1 counter-electromotive voltage VCm1 has the characteristics of rising as the first MG rotational speed Nm1 rises. Therefore, an MG1 counter-electromotive voltage VCm1($\beta$) at the time when the first MG rotational speed Nm1 is equal to the predetermined value $\beta$ increases above an MG1 counter-electromotive voltage VCm1($\alpha$) at the time when the first MG rotational speed Nm1 is equal to the predetermined value α. The ECU 300 changes the engine rotational speed Ne such that the difference between the MG1 counter-electromotive voltage VCm1(β) and the MG1 counter-electromotive voltage VCm1(α) becomes equal to or larger than a predetermined value.

When the VH sensor value changes by a predetermined value or more through the counter-electromotive voltage change process, the VH sensor 232 is considered to correctly detect the change in the system voltage VH, so the ECU 300 determines that the VH sensor 232 is normal. When the VH sensor 232 is normal, the factor in the occurrence of a VH abnormality may be an abnormality in the converter 210, and it may be impossible to control the converter 210 to the upper arm-on state. Therefore, the ECU 300 selects VH-F/B running as an evacuation running mode.

On the other hand, when the VH sensor value does not change by the predetermined value or more through the counter-electromotive voltage change process, the VH sensor 232 is considered not to correctly detect the change in the system voltage VH, so the ECU 300 determines that the VH sensor 232 is abnormal. When it is determined that the VH sensor 232 is abnormal, the factor in the occurrence of a VH abnormality is an abnormality in the VH sensor 232, and the converter 210 is considered to be normal. Therefore, the ECU 300 selects upper arm-on running as an evacuation running mode.

Figure 12:
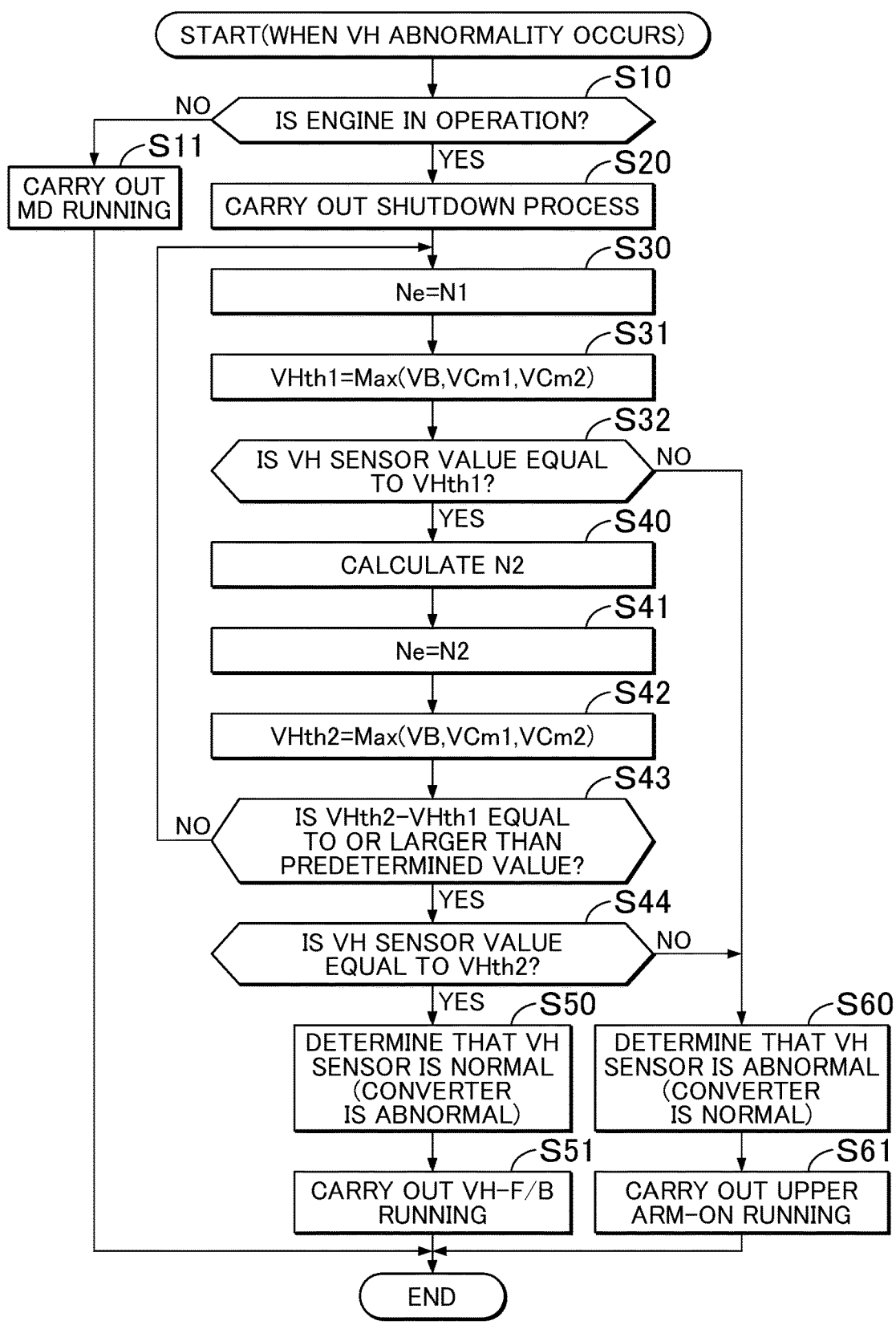
FIG. 12 is a flowchart showing an exemplary processing procedure of an ECU.

FIG. 12 is a flowchart showing an exemplary processing procedure that is carried out by the ECU 300 when a VH abnormality occurs.

In step (step will be abbreviated hereinafter as "S") 10, the ECU 300 determines whether or not the engine 100 is in operation. If the engine 100 is stopped (NO in S10), it may be impossible to start the engine 100 since engine cranking by the first MG 10 cannot be carried out due to the influence of a VH abnormality. Therefore, the ECU 300 selects MD running in which the vehicle runs with the engine 100 stopped in S11 (see FIGS. 3 and 4).

If the engine 100 is in operation (YES in S10), the ECU 300 carries out the above-mentioned shutdown process in S20. In concrete terms, the ECU 300 stops (shuts off gates of) the converter 210, the first inverter 221 and the second inverter 222 all (see FIG. 10). Incidentally, the shutdown process is continued until a processing step of S51 or S61 that will be described later is carried out.

In S30, the ECU 300 controls the output of the engine 100 such that the engine rotational speed Ne becomes equal to the first target speed N1. The first target speed N1 is set in advance to, for example, a relatively low value (e.g., 1000 rpm).

When the engine rotational speed Ne becomes equal to the first target speed N1, the ECU 300 sets the highest of the battery voltage VB, the MG1 counter-electromotive voltage VCm1 and the MG2 counter-electromotive voltage VCm2 as a first comparative value VHth1 in S31 (see the expression (1)). The first comparative value VHth1 is an estimated value of the system voltage VH at the time when the engine rotational speed Ne is equal to the first target speed N1. The MG1 counter-electromotive voltage VCm1 and the MG2 counter-electromotive voltage VCm2 are estimated from the first MG rotational speed Nm1 and the second MG rotational speed Nm2 respectively.

In S32, the ECU 300 determines whether or not the VH sensor value indicates the first comparative value VHth1.

If the VH sensor value indicates the first comparative value VHth1 (YES in S32), the ECU 300 calculates the second target speed N2 of the engine rotational speed Ne in S40. By changing the engine rotational speed Ne from the first target speed N1 to the second target speed N2, the ECU 300 calculates the second target speed N2 such that the MG1 counter-electromotive voltage VCm1 changes by a predetermined value (e.g., 100 V) or more. For example, the ECU 300 calculates the second target speed N2 of the engine rotational speed Ne through the use of an expression (2) shown below.

$$N2 = VHth2\text{tag}/K/\gamma \qquad (2)$$

In the expression (2), "VHth2tag" denotes a target value of the second comparative value VHth2, and is set to a value that is higher than the first comparative value VHth1 by a predetermined value (e.g., 100 V). "γ" denotes a gear ratio of the planetary gear mechanism 30. "K" denotes an MG1 counter-electromotive constant (a coefficient for converting the first MG rotational speed Nm1 into the MG1 counter-electromotive voltage VCm1).

In S41, the ECU 300 controls the output of the engine 100 such that the engine rotational speed Ne becomes equal to the second target speed N2. Incidentally, the processing steps of S30 and S41 are equivalent to the above-mentioned counter-electromotive voltage change process. That is, the engine rotational speed Ne changes from the first target speed N1 to the second target speed N2 in S40, so the second target speed N2 is calculated as a value at which the MG1 counter-electromotive voltage VCm1 changes by a predetermined value or more. Therefore, the engine rotational speed Ne changes from the first target speed N1 (S30) to the second target speed N2 (S41), so the MG1 counter-electromotive voltage VCm1 changes by the predetermined value or more.

When the engine rotational speed Ne becomes equal to the second target speed N2, the ECU 300 sets the highest of the battery voltage VB, the MG1 counter-electromotive voltage VCm1 and the MG2 counter-electromotive voltage VCm2 as the second comparative value VHth2 in S42 (see the expression (1)). The second comparative value VHth2 is an estimated value of the system voltage VH at which the engine rotational speed Ne is equal to the second target speed N2. The MG1 counter-electromotive voltage VCm1 and the MG2 counter-electromotive voltage VCm2 are estimated from the first MG rotational speed Nm1 and the second MG rotational speed Nm2 respectively.

In S43, the ECU 300 determines whether or not a value obtained by subtracting the first comparative value VHth1 from the second comparative value VHth2 is equal to or higher than a predetermined value (e.g., 100 V). This determination is made to enhance the accuracy in determining whether or not the VH sensor 232 is normal, by guaranteeing that the change in the system voltage VH through the counter-electromotive voltage change process is equal to or higher than a predetermined value. That is, even in the case where the MG1 counter-electromotive voltage VCm1 changes by a predetermined value or more, when the battery voltage VB and the MG2 counter-electromotive voltage VCm2 are higher than the MG1 counter-electromotive voltage VCm1, the change in the MG1 counter-electromotive voltage VCm1 is not reflected by the change in the system voltage VH, and the amount of change in the system voltage VH may become lower than the predetermined value. S43 is a processing step for determining whether or not this case is relevant.

If the value obtained by subtracting the first comparative value VHth1 from the second comparative value VHth2 is lower than the predetermined value (NO in S43), it cannot be accurately determined whether the VH sensor 232 is normal. Therefore, the ECU 300 returns the process to S30, and carries out the processing steps starting from S30 again.

If the value obtained by subtracting the first comparative value VHth1 from the second comparative value VHth2 is equal to or higher than the predetermined value (YES in S43), the ECU 300 determines in S44 whether or not the VH sensor value indicates the second comparative value VHth2.

If the VH sensor value indicates the second comparative value VHth2 (YES in S44), the VH sensor value has also changed by the predetermined value or more (has changed from the first comparative value VHth1 to the second comparative value VHth2) as the system voltage VH has changed by the predetermined value or more (has changed from the first comparative value VHth1 to the second comparative value VHth2) through the counter-electromotive voltage change process. Therefore, the ECU 300 determines in S50 that the VH sensor 232 is normal (the converter 210 may be abnormal), and carries out VH-F/B running in S51 (see FIGS. 5 and 6).

On the other hand, if the VH sensor value does not indicate the first comparative value VHth1 (NO in S32) or if the VH sensor value does not indicate the second comparative value VHth2 (NO in S44), the ECU 300 determines in S60 that the VH sensor 232 is abnormal (the converter 210 is normal), and carries out the above-mentioned upper arm-on running in S61 (see FIGS. 7 and 8).

As described above, the ECU 300 according to the present embodiment of the present disclosure causes the system voltage VH to change as the MG1 counter-electromotive voltage VCm1 changes, by carrying out the shutdown process when a VH abnormality occurs. In this state, the ECU 300 carries out the counter-electromotive voltage change process for changing the MG1 counter-electromotive voltage VCm1 by the predetermined value or more through the use of the motive power of the engine 100. When the VH sensor value has changed by the predetermined value or more through the counter-electromotive voltage change process, the VH sensor 232 is assumed to correctly detect the change in the system voltage VH, so the ECU 300 determines that the VH sensor 232 is normal. As described hitherto, in the present embodiment of the present disclosure, when a VH abnormality occurs, it can be determined through the use of the MG1 counter-electromotive voltage VCm1 that the VH sensor 232 is normal.

Then, in the case where the VH sensor 232 is normal, even when the system voltage VH (the voltage that is applied to the second MG 20) changes through engine power generation, the change can be correctly detected by the VH sensor 232, and the controllability of the second MG 20 can be ensured. Therefore, the ECU 300 performs VH-F/B control for controlling the system voltage VH to a target voltage through feedback through the use of the VH sensor value, while operating the engine 100 to carry out engine power generation. Thus, a larger quantity of power that can be used during evacuation running can be ensured than in the case of carrying out MD running in which the vehicle runs in an evacuating manner with the engine 100 stopped. As a result, when a VH abnormality occurs, the evacuation running distance can be made long while ensuring the controllability of the second MG 20.

Furthermore, when the VH sensor 232 is abnormal, it is assumed that the factor in the occurrence of a VH abnormality is an abnormality in the VH sensor 232, and that the converter 210 is normal. Therefore, the ECU 300 carries out upper arm-on running for putting the upper arm element Q1 of the converter 210 into the conductive state while carrying out engine power generation. Thus, it is possible not only to supply the power obtained through engine power generation to the second MG 20, but also to charge the battery 150 with this power. Therefore, the evacuation running distance can be made much longer than in the case where VH-FB control is performed.

<First Modification Example>

In the flowchart of FIG. 12 described in the above-mentioned embodiment of the present disclosure, if the result of the determination in at least one of S32 and S44 is NO, it is determined that the VH sensor 232 is abnormal (S60), and upper arm-on running is carried out on the premise that the converter 210 is normal (S61).

However, when the VH sensor 232 is abnormal, MD running may be carried out instead of carrying out upper arm-on running. That is, when the VH sensor 232 is abnormal, the possibility of the converter 210 being abnormal at the same time is not zero, so MD running may be carried out instead of carrying out upper arm-on running.

<Second Modification Example>

The vehicle 1 described in the above-mentioned embodiment of the present disclosure is a so-called series-parallel-type hybrid vehicle in which the engine 100 is coupled to the first MG 10 and the output shaft 60 via the planetary gear mechanism 30 and the motive power of the engine 100 can be transmitted to both the first MG 10 and the output shaft 60.

However, the hybrid vehicle to which the present disclosure is applicable is not absolutely required to be a series-parallel-type hybrid vehicle, but may be a so-called series-type hybrid vehicle in which the motive power of an engine is used for power generation instead of being directly transmitted to driving wheels. For example, the hybrid vehicle may be configured by excluding the planetary gear mechanism 30 from the vehicle 1 shown in FIG. 1, disconnecting the engine 100 from the output shaft 60, and directly coupling the engine 100 to the first MG 10.

<Third Modification Example>

In the flowchart of FIG. 12 described in the above-mentioned embodiment of the present disclosure, it is determined whether or not the engine 100 is in operation at the time of the occurrence of a VH abnormality (S10). If the engine 100 is stopped (NO in S10), it may be impossible to start the engine 100 as a result of the inability to crank the engine by the first MG 10 due to the influence of a VH abnormality, so MD running is selected (S11).

However, in the case where, for example, the vehicle is equipped with a starter that cranks the engine through the use of the power of an auxiliary battery, the engine 100 can be started without being influenced by a VH abnormality. Therefore, the processing steps of S10 and S11 may be omitted.

The embodiment of the present disclosure disclosed herein should be considered to be exemplary and nonrestrictive in all respects. The scope of the present disclosure is specified not by the foregoing description but by the claims. The present disclosure is intended to encompass all the modifications that are equivalent in significance and scope to the claims.

What is claimed is:

1. A hybrid vehicle comprising:
   an engine;
   a first rotating electrical machine connected to the engine;
   a second rotating electrical machine connected to a driving wheel;
   a pair of power lines;
   a first inverter electrically connected to the pair of the power lines and the first rotating electrical machine;

a second inverter electrically connected to the pair of the power lines and the second rotating electrical machine;
a battery;
a converter electrically connected to the battery and the pair of the power lines;
a voltage sensor configured to detect a system voltage as a voltage between the pair of the power lines; and
an electronic control unit configured to:
control the engine, the converter, the first inverter and the second inverter;
control the converter, the first inverter and the second inverter to a gate shutoff state when the voltage sensor outputs an abnormal value, as a shutdown process;
control a motive power of the engine in such a manner as to change a counter-electromotive voltage of the first rotating electrical machine by a predetermined value or more by changing a rotational speed of the first rotating electrical machine while the shutdown process is carried out, as a voltage change process;
determine that the voltage sensor is normal and perform a first evacuation running control when an output of the voltage sensor changes by the predetermined value or more while the voltage change process is carried out; and
control the converter to the gate shutoff state, control the motive power of the engine in such a manner as to rotate the first rotating electrical machine and put the first rotating electrical machine into a regeneration state, and control the second rotating electrical machine to a power running state, as the first evacuation running control.

2. The hybrid vehicle according to claim 1, wherein
the pair of the power lines are a pair of a positive electrode line and a negative electrode line that is connected to a negative electrode of the battery,
the converter has an upper arm that is connected to the positive electrode line as one of the pair of the power lines and a positive electrode of the battery,
the electronic control unit is configured to:
control the engine in such a manner as to change a rotational speed of the engine from a first speed to a second speed, as the voltage change process;
determine that the voltage sensor is abnormal and carry out a second evacuation running at least either in a case where an estimated value of the system voltage at a time when the rotational speed of the engine is equal to the first speed is different from an output of the voltage sensor or in a case where an estimated value of the system voltage at a time when the rotational speed of the engine is equal to the second speed is different from the output of the voltage sensor, while the voltage change process is carried out; and
control the upper arm of the converter to a conductive state, control the motive power of the engine in such a manner as to rotate the first rotating electrical machine and put the first rotating electrical machine into the regeneration state, and control the second rotating electrical machine to the power running state, as the second evacuation running.

* * * * *

UNITED STATES PATENT AND TRADEMARK OFFICE
CERTIFICATE OF CORRECTION

PATENT NO. : 9,994,215 B2
APPLICATION NO. : 15/458374
DATED : June 12, 2018
INVENTOR(S) : Shikoh Takakura and Shinichiro Minegishi Page 1 of 1

It is certified that error appears in the above-identified patent and that said Letters Patent is hereby corrected as shown below:

In the Specification

In Column 3, Line 25, delete "aim" and insert --arm--, therefor.

In Column 10, Line 36, delete "aim" and insert --arm--, therefor.

Signed and Sealed this
Twenty-eighth Day of May, 2019

Andrei Iancu
*Director of the United States Patent and Trademark Office*